United States Patent
Belakshe et al.

(10) Patent No.: US 11,091,977 B2
(45) Date of Patent: Aug. 17, 2021

(54) METHODS FOR DIVERSION AND CONTROLLING FLUID-LOSS USING FORMATE BRINE COMPOSITIONS

(71) Applicant: HALLIBURTON ENERGY SERVICES, INC., Houston, TX (US)

(72) Inventors: Ravikant S. Belakshe, Pune (IN); Sumit Ramesh Songire, Pune (IN); Larry Steven Eoff, Porter, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 347 days.

(21) Appl. No.: 16/321,499

(22) PCT Filed: Oct. 25, 2016

(86) PCT No.: PCT/US2016/058584
§ 371 (c)(1),
(2) Date: Jan. 29, 2019

(87) PCT Pub. No.: WO2018/080437
PCT Pub. Date: May 3, 2018

(65) Prior Publication Data
US 2021/0140269 A1     May 13, 2021

(51) Int. Cl.
| | | |
|---|---|---|
| *E21B 33/138* | (2006.01) | |
| *C09K 8/512* | (2006.01) | |
| *C09K 8/52* | (2006.01) | |
| *C09K 8/60* | (2006.01) | |
| *E21B 37/06* | (2006.01) | |
| *E21B 43/04* | (2006.01) | |

(Continued)

(52) U.S. Cl.
CPC ............ *E21B 33/138* (2013.01); *C09K 8/512* (2013.01); *C09K 8/52* (2013.01); *C09K 8/60* (2013.01); *E21B 37/06* (2013.01); *E21B 43/04* (2013.01); *E21B 43/11* (2013.01); *E21B 43/25* (2013.01); *C09K 2208/26* (2013.01)

(58) Field of Classification Search
None
See application file for complete search history.

(56) References Cited

U.S. PATENT DOCUMENTS

| | | |
|---|---|---|
| 4,750,562 A | 6/1988 | Jennings, Jr. |
| 5,728,652 A | 3/1998 | Dobson, Jr. et al. |
| 5,785,747 A | 7/1998 | Vollmer et al. |

(Continued)

OTHER PUBLICATIONS

Silica Flour—SSA-1 Material Safety Data Sheet; Halliburton; 2013.*

(Continued)

*Primary Examiner* — Andrew Sue-Ako
(74) *Attorney, Agent, or Firm* — Haynes and Boone, LLP (57) ABSTRACT

Methods of temporarily blocking zones of a subterranean formation for diversion, isolation, and fluid-loss control are provided. The method of diverting a fluid includes introducing a treatment fluid comprising a formate brine, xanthan gum, and a cross-linking agent into the formation; allowing the treatment fluid to set into a gel in perforations in a first zone of the formation to block the perforations in the first zone; introducing a stimulation fluid into the formation; and diverting the stimulation fluid away from the perforations in the first zone to perforations in a second zone of the formation.

20 Claims, 6 Drawing Sheets

(51) Int. Cl.
*E21B 43/11* (2006.01)
*E21B 43/25* (2006.01)

(56) References Cited

U.S. PATENT DOCUMENTS

| | | | |
|---|---|---|---|
| 6,838,417 B2 | 1/2005 | Bouwmeester et al. | |
| 7,268,101 B2 | 9/2007 | van Batenburg et al. | |
| 2007/0213233 A1 | 9/2007 | Freeman et al. | |
| 2007/0281868 A1 | 12/2007 | Pauls et al. | |
| 2008/0039347 A1* | 2/2008 | Welton | C09K 8/68 |
| | | | 507/213 |
| 2008/0078545 A1 | 4/2008 | Welton et al. | |
| 2015/0072902 A1* | 3/2015 | Lafitte | C09K 8/44 |
| | | | 507/112 |

OTHER PUBLICATIONS

International Search Report and Written Opinion issued by the Korean Intellectual Property Office for International Application No. PCT/US2016/058584 dated Jul. 11, 2017. (15 pages).

\* cited by examiner

METHODS FOR DIVERSION AND CONTROLLING FLUID-LOSS USING FORMATE BRINE COMPOSITIONS

BACKGROUND

The present invention relates generally to methods and compositions for treating subterranean formations. In particular, the present invention relates to methods of temporarily blocking zones of a subterranean formation by providing a treatment fluid including formate brine and cross-linked xanthan gum, and introducing the treatment fluid into the formation.

Providing effective fluid-loss control for well treatment fluids is highly desirable. Fluid-loss control materials are often added to treatment fluids to aid in fluid-loss control. These are additives that are generally designed to lower the volume of a filtrate that passes through a filter medium, e.g., permeable rock or a filter cake. Most attain their fluid-loss control from the presence of solvent-specific solids, or from polymers that rely on filter cake buildup and on viscoelasticity to inhibit flow into and through the formation. A variety of fluid-loss control materials have been used and evaluated, including foams, oil-soluble resins, acid-soluble particulates, graded salt slurries, linear viscoelastic polymers, degradable polymers and heavy metal-crosslinked polymers.

Many conventional fluid-loss control additives permanently reduce the permeability of a subterranean formation, negatively affect the rheology of the treatment fluid in which they are used, and/or reduce the rate at which the fluid is allowed to penetrate or leak off into desirable locations within the subterranean formation. Moreover, while it may be desirable to control or prevent fluid-loss for a given period of time, in some instances it may become desirable to later allow a treatment fluid to penetrate or leak off into that portion of the subterranean formation. Thus, costly and time-consuming operations may be required to reverse the effects of conventional fluid-loss control additives on the treatment fluid and/or to restore permeability to those portions of the subterranean formation affected by the fluid-loss control additives.

In addition to helping control the loss of fluid into the formation, additives may also be added to treatment fluids to divert the treatment fluid toward desired areas within the formation. For example, it may be desirable to add a diverting agent toward the end of an operation treating a section of a subterranean formation such that the agent will then slow or stop the flow of further treatment fluid into that area, thus diverting later-placed fluid to other areas.

Various particulates have been used in treatment fluids as a fluid-loss control agent and/or diverting agent. Particulates may be used as fluid-loss control materials in treatment fluids to fill and seal the pore spaces and natural and manmade fractures in a subterranean formation or to contact the surface of a formation face or proppant pack, thereby forming a filter cake that blocks the pore spaces and natural and manmade fractures in the formation or proppant pack.

The use of particulates in fluid-loss control, however, presents several challenges. For example, if the sizes of the particulates are not optimized for the pore spaces and fractures, remedial treatments may be required to remove the previously placed fluid-loss control materials. Generally, particulates that have become lodged in pore spaces, fractures, or pore throats may be difficult or costly to remove. Furthermore, particulate fluid-loss control materials may not be effective in low-permeability formations since the leakoff rate in those formations is not high enough to pull the particulates into the pore spaces or fractures or into contact with the surface of the formation face or proppant pack so as to block or seal off the pore spaces and fractures.

Thus, there is a continuing need for improved treatment fluids and methods for temporarily blocking zones of a subterranean formation for diversion, isolation, and fluid-loss control.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

According to several exemplary embodiments, the methods and compositions of the present invention temporarily block zones of a subterranean formation for multiple applications, including diversion, isolation, and fluid-loss control. As used herein, a "zone" is defined as an interval or unit of rock that is differentiated from surrounding rock on the basis of at least one factor such as, but not limited to, the particular interval's fossil content, fluid content, bulk density, permeability, porosity, compressive strength, tensile strength, shear strength, crystalline structure, or other features, such as faults or fractures. Often, a particular unit of rock may be differentiated from surrounding rock by engineering parameters (e.g., Poisson's Ratio, Shear Modulus, Bulk Modulus, and Young's Modulus) that may be unique to the particular unit of rock. In addition to zones including hydrocarbons (e.g., oil and gas), production wells frequently encounter brine and fresh water zones, as well as zones containing undesirable supercritical fluids or gases (e.g., carbon dioxide and hydrogen sulfide). Production wells also may encounter zones containing shales, which may hinder the effectiveness of various subterranean operations, in view of shale's tendency, upon intermingling with some aqueous fluids, to swell and at least partially degrade into clay particles.

To enhance the efficiency of hydrocarbon production from a well, production zones (e.g., zones from which hydrocarbons are being, or soon will be, produced) may be isolated from the non-production zones (e.g., zones from which hydrocarbons or other fluids are not presently intended to be produced) of the subterranean formation. Additionally, it may be desirable to define certain production zones (e.g., more productive zones and/or zones containing a particular fluid to be produced) and isolate them from one another. As used herein, "isolating a zone" and "zonal isolation" refer to the impairment or prevention of fluid communication between (1) a zone in a subterranean formation and a cased or open well bore penetrating that zone, or (2) at least one zone and another zone in a subterranean formation.

According to several exemplary embodiments, treatment fluids including formate brine and cross-linked xanthan gum (e.g., cross-linked with borate cross-linker) are introduced into a subterranean formation to temporarily block a zone of the formation. Advantageously, these components are readily available. Moreover, formate brine provides high solubility in water at a wide range of densities, extends the thermal stability of bio-polymers, and reduces the rate of hydrolytic and oxidative degradation of many viscosifiers at high temperatures.

According to several exemplary embodiments, the treatment fluid can be used for low, moderate, and high density applications. According to several exemplary embodiments, the density of the treatment fluid can be varied using different formate salts.

According to several exemplary embodiments, the treatment fluid can be used in high temperature applications. According to several exemplary embodiments, the treatment fluid can be used at temperatures up to 300° F.

According to several exemplary embodiments, the treatment fluids are used to divert, isolate, and/or provide fluid-loss control to subterranean formations. According to several exemplary embodiments, the treatment fluids, with time and when exposed to temperatures in the wellbore, form a viscous cross-linked gel. According to several exemplary embodiments, a solid (e.g., powdered sand) is added to provide additional strength to the gel when used in high permeability formations (e.g., about 12,000 millidarcy (mD)). According to several exemplary embodiments, the gel sustains reasonable extrusion pressure.

Advantageously, the treatment fluids are environmentally safer than other compositions that are typically used. In addition, according to several exemplary embodiments, the gelled treatment fluid is thermally stable and is readily degradable upon treatment with acid (e.g., hydrochloric acid). According to several exemplary embodiments, the viscosity of the gelled treatment fluid is reduced significantly after treatment with an acid. Moreover, according to several exemplary embodiments, the treatment fluid is not as sensitive to pH as other compositions that are typically used.

According to several exemplary embodiments, a method of diverting a stimulation fluid over a zone or from one zone to another zone in a subterranean formation is provided. The method includes introducing a treatment fluid comprising a formate brine, xanthan gum, and a cross-linking agent into the formation; allowing the treatment fluid to set into a gel in perforations in a first zone of the formation to block the perforations in the first zone; introducing a stimulation fluid into the formation; and diverting the stimulation fluid away from the perforations in the first zone to perforations in a second zone of the formation. According to several exemplary embodiments, the formate brine includes a potassium formate brine.

According to several exemplary embodiments, a pump is used to introduce the treatment fluid into the formation.

According to several exemplary embodiments, the first zone includes a high permeability zone and the second zone includes a low permeability zone.

According to several exemplary embodiments, the method further includes perforating the casing to form perforations in the first zone or the second zone.

According to several exemplary embodiments, the method further includes introducing an acid into the formation. According to several exemplary embodiments, the acid is allowed to degrade the gel in the perforations in the first zone. According to several exemplary embodiments, the acid includes hydrochloric acid.

According to several exemplary embodiments, the treatment fluid further includes a powdered sand. According to several exemplary embodiments, the treatment fluid includes about 1 weight percent (e.g., 1.5 weight percent) to about 78 weight percent (e.g., 77.6 weight percent) of a formate salt; about 1 weight percent (e.g., about 1.2 weight percent) to about 3 weight percent of the xanthan gum; about 0.3 weight percent to about 1 weight percent of the cross-linking agent; and about 5 weight percent to about 15 weight percent of the powdered sand.

According to several exemplary embodiments, a method of controlling fluid-loss in a subterranean formation is provided. The method includes perforating a casing to form perforations; introducing a treatment fluid into the formation after the casing is perforated or before gravel packing, wherein the treatment fluid includes a formate brine, xanthan gum, and a cross-linking agent; allowing the treatment fluid to set into a gel in the perforations to reduce fluid-loss through the perforations; and introducing a stimulation fluid or a gravel pack slurry into the formation.

According to several exemplary embodiments, the method further includes introducing the treatment fluid after introducing the gravel pack.

According to several exemplary embodiments, the method further includes introducing an acid into the formation. According to several exemplary embodiments, the method further includes allowing the acid to degrade the gel in the perforations.

According to several exemplary embodiments, the treatment fluid further includes a powdered sand. According to several exemplary embodiments, the treatment fluid includes about 1 weight percent (e.g., about 1.5 weight percent) to about 78 weight percent (e.g., about 77.6 weight percent) of a formate salt; about 1 weight percent (e.g., about 1.4 weight percent) to about 2 weight percent (e.g., about 2.4 weight percent) of the xanthan gum; about 0.4 weight percent (e.g., 0.36 weight percent) to about 0.6 weight percent of the cross-linking agent; and about 5 weight percent to about 15 weight percent of the powdered sand.

According to several exemplary embodiments, a method of isolating one zone of a subterranean formation from another zone of the formation is provided. The method includes introducing a treatment fluid comprising a formate brine, xanthan gum, and a cross-linking agent into the formation into a lower zone of the formation; allowing the treatment fluid to set into a gel to isolate the lower zone from the treatment fluid; introducing a scale dissolving fluid into an upper zone of the formation; and allowing the scale dissolving fluid to treat scale in the upper zone. According to several exemplary embodiments, the formate brine includes a potassium formate brine.

According to several exemplary embodiments, the method further includes introducing an acid into the formation. According to several exemplary embodiments, the method further includes allowing the acid to degrade the gel in the lower zone. According to several exemplary embodiments, the acid includes hydrochloric acid.

Treatment fluids may be used in any number of subterranean operations. As used herein, "treat," "treatment," and "treating" refer to any subterranean operation that uses a fluid in conjunction with achieving a desired function and/or for a desired purpose. More specific examples of treatment operations include drilling operations, fracturing operations, gravel packing operations, wellbore clean out operations, acidizing operations, scale dissolution and removal, sand control operations, and consolidation operations.

Figure 1:
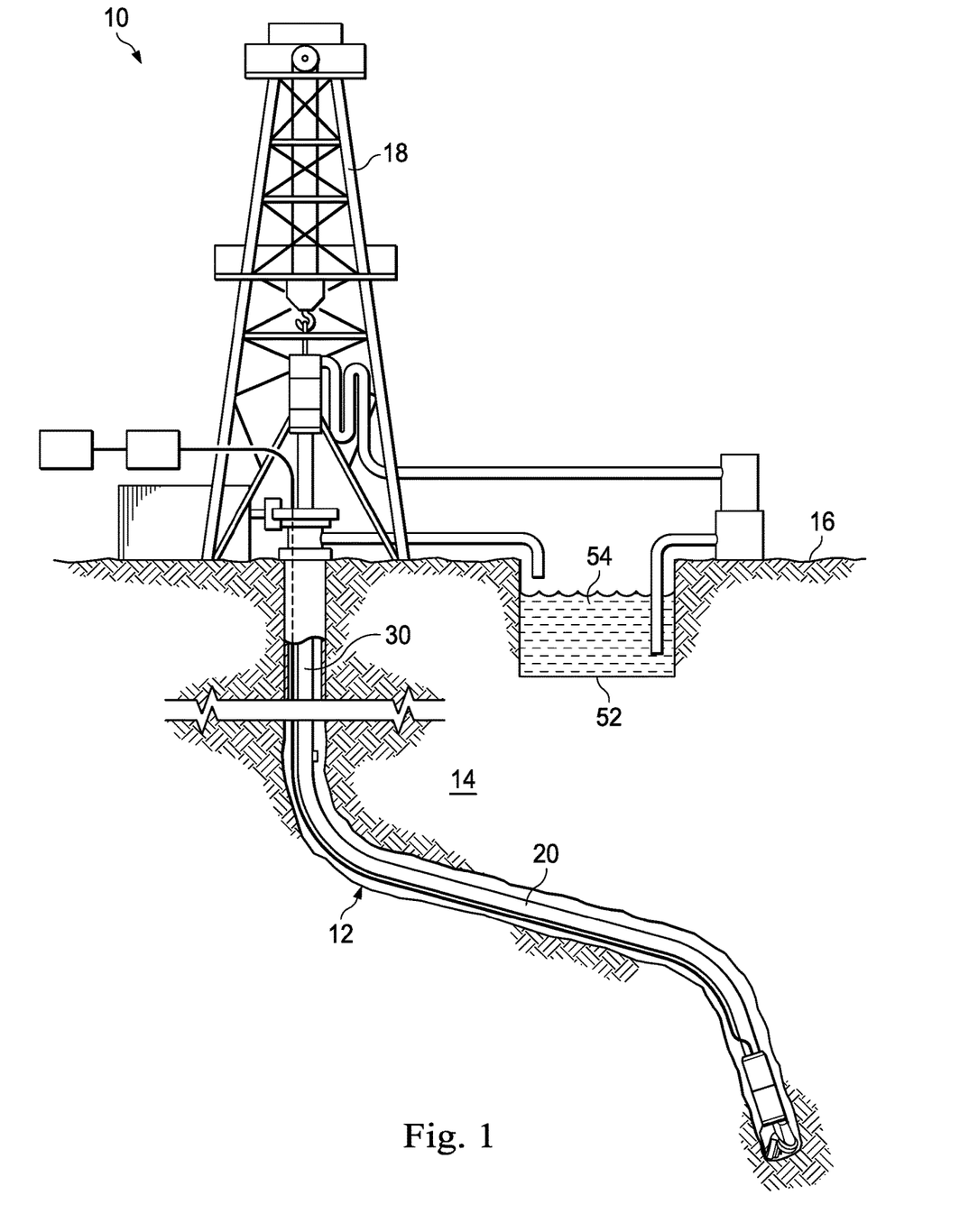
FIG. 1 illustrates a land-based drilling and production system.

Turning to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, drilling fluid, slurry, acidizing fluid, liquid water, steam, hydraulic fracturing fluid, propane, nitrogen, carbon dioxide or some other type of fluid.

According to several exemplary embodiments, a method of temporarily blocking a zone of a subterranean formation includes providing a treatment fluid including formate brine, xanthan gum, and a cross-linking agent (with or without added solids). According to several exemplary embodiments, the formate brine comprises one or more of sodium formate, potassium formate, and cesium formate. As used herein, a "cross-linking agent" is a substance capable of bonding with two or more sites on a polymer (e.g., xanthan gum) or on different polymers. According to several exemplary embodiments, the cross-linking agent includes a borate cross-linking compound (e.g., boron, boric acid, borax, and sodium tetraborate).

According to several exemplary embodiments, a formate salt is present in the treatment fluid in an amount of about 1 percent to about 78 percent by weight of the treatment fluid. According to several exemplary embodiments, xanthan gum is present in the treatment fluid in an amount of about 1 percent to about 3 percent by weight of the treatment fluid. According to several exemplary embodiments, the cross-linking agent is present in the treatment fluid in an amount of about 0.3 percent to about 1 percent by weight of the treatment fluid. According to several exemplary embodiments, the solids (e.g., powdered sand), when present, are present in the treatment fluid in an amount of about 5 percent to about 15 percent by weight of the treatment fluid.

According to several exemplary embodiments, the treatment fluids may also include one or more additives, such as gel stabilizers, fluid-loss control additives, particulates, acids, corrosion inhibitors, catalysts, clay stabilizers, biocides, friction reducers, surfactants, solubilizers, pH adjusting agents, bridging agents, dispersants, flocculants, foamers, gases, defoamers, $H_2S$ scavengers, $CO_2$ scavengers, oxygen scavengers, scale inhibitors, lubricants, viscosifiers, and weighting agents. One of ordinary skill in the art, with the benefit of this disclosure, will be able to determine the appropriate type and amount of such additives for a particular application. For example, according to several exemplary embodiments, it may be desired to foam a treatment fluid using a gas, such as air, nitrogen, or carbon dioxide.

According to several exemplary embodiments, to obtain the maximum benefits of acidizing and/or fracturing, the entire production zone may be treated with a stimulation fluid. In many cases, high permeability zones are adjacent to low permeability zones (e.g., about 0.1 to 100 mD) in a subterranean formation. As the stimulation fluid is pumped, it will preferentially enter the zone of least resistance, which is typically the high permeability zone. As stimulation fluid enters the high permeability zone, the stimulation fluid reacts with the formation material and opens additional flow paths. As a result, a high permeability zone receives most or all of the stimulation while the desired low permeability zone does not receive the desired stimulation. Thus, when the stimulation fluid is introduced into a formation with various permeabilities, the majority of the stimulation fluid enters the high permeability zone, while the lower permeability zone has little invasion.

According to several exemplary embodiments, the treatment fluids are used to divert stimulation fluid (e.g., an acidizing fluid and/or fracturing fluid) over a zone or from one zone to another zone in a formation. Diverting agents are used to seal off a portion or zone of a subterranean formation. According to several exemplary embodiments, a stimulation fluid is diverted from highly permeable zones of a formation to less permeable zones of the formation. For example, a high permeability zone is perforated, a stimulation fluid is pumped through the perforations to create fractures that extend through the formation, a treatment fluid including formate brine, xanthan gum, and a cross-linking agent is introduced into the perforations and fractures and allowed to gel to block the perforations and fractures, a low permeability zone is perforated, and stimulation fluids are provided to the low permeability zone to initiate and create fractures through the perforations. According to several exemplary embodiments, these steps may be repeated until the desired number of stages of stimulation fluids has been pumped. According to several exemplary embodiments, stimulation fluids are re-directed to target production zones and are diverted away from high permeability zones by temporarily blocking the high permeability zones. According to several exemplary embodiments, the gelled treatment fluids are advantageously removable from the high permeability zones with acid after treatment to eliminate any potential damage to the high permeability zones. Suitable acids include hydrochloric acid, acetic acid, hydrofluoric acid, and combinations thereof.

According to several exemplary embodiments, the treatment fluids are used to control fluid-loss in different scenarios. As used herein, "fluid-loss" refers to the undesirable migration or loss of fluids (such as the fluid portion of a drilling mud or cement slurry) into a subterranean formation and/or a proppant pack. Fluid-loss may be problematic in any number of operations. For example, in fracturing treatments, fluid-loss into the formation may result in a reduction in fluid efficiency, such that the fracturing fluid cannot propagate the fracture as desired.

According to several exemplary embodiments, the treatment fluid is introduced into a formation after perforating operations. In this instance, it is desired to plug existing perforations so that fluid that is subsequently introduced into the formation is not lost into the existing perforations. Before new perforations are made, the treatment fluid is pumped into the formation and allowed to set into a gel to form a barrier to fluid flow through the existing perforations.

New perforations are then made, fluid (e.g., stimulation fluid) is pumped into the formation, and this fluid is not lost to the existing perforations.

According to several exemplary embodiments, the treatment fluid is introduced into a formation that has already been perforated in multiple zones (e.g., a first zone and a second zone). Treatment fluid is introduced into the formation and allowed to gel in perforations in a first zone. Fluid that is subsequently introduced into the formation is diverted away from the perforations in the first zone to perforations in a different zone (e.g., the second zone) of the formation.

In producing hydrocarbons from subterranean formations, it is not uncommon for large volumes of particulate material (e.g. sand) to flow into the wellbore along with the produced fluids. These particulates routinely cause a variety of problems and must be controlled in order for production to be economical. A popular technique used for controlling the production of particulates (e.g. sand) from a well is one which is commonly known as "gravel packing."

In a typical gravel pack completion, a screen is lowered into the wellbore on a workstring and is positioned adjacent the subterranean formation. Particulate material, collectively referred to as gravel, and a carrier liquid is then pumped as a slurry down the workstring where it exits through a "cross-over" above the screen and flows downward between the screen and the well casing or open hole, as the case may be. The carrier liquid in the slurry normally flows into the formation and/or the openings in the screen which, in turn, are sized to prevent the flow of gravel therethrough. This results in the gravel being deposited or "screened out" in the annulus around the screen where it collects to form the gravel pack. The gravel, in turn, is sized so that it forms a permeable mass which allows flow of the produced fluids therethrough and into the screen while blocking the flow of any particulates produced with the formation fluids.

One problem that exists in gravel packing arises from the loss of carrier fluid in the gravel packing slurry to the formation while installing the gravel pack. This fluid can be very expensive and typically needs to be substantially recovered after it has served its purpose for it to be used economically. In addition, further fluid escape into the formation after gravel packing should be avoided, as this fluid-loss can cause formation damage.

According to several exemplary embodiments, the treatment fluids are introduced into the formation before and/or after gravel packing to ensure that the gravel packing carrier fluid is not lost to the formation and subsequent fluids are introduced into production zones. For example, the treatment fluid is introduced into the formation before gravel packing operations begins. This allows the treatment fluid to set into a gel in existing perforations to reduce loss of fluid through the existing perforations. In another example, the treatment fluid is introduced after gravel packing operations to ensure that subsequently introduced fluids are not lost to the formation.

According to several exemplary embodiments, the treatment fluids are used to isolate a zone by forming a barrier to keep scale dissolving fluids/chemicals in particular zones to ensure that zones in the formation where scale is likely to be formed are treated. As used herein, "scale" refers to a mineral or solid salt deposit that forms when the saturation of formation water to one or more minerals is affected by changing physical conditions (such as temperature, pressure, or composition), thus causing minerals and salts previously in solution to precipitate into solids. These precipitations are known to form near the wellbore, inside casing, tubing, pipes, pumps and valves (e.g., downhole safety valves), and around heating coils. Reduction of near wellbore permeability, perforation tunnel diameter, production tubing diameter, and propped fracture conductivities can significantly reduce well productivity. Over time, large scale deposits can reduce fluid flow and heat transfer as well as promote corrosion and bacterial growth. As the deposits grow, the production rate decreases and even the whole operation could be forced to halt.

For example, typically, an upper zone of a formation is more likely to form scale than a lower zone. The treatment fluid can be introduced into the formation and allowed to gel to block or isolate the lower zone from scale dissolving fluids/chemicals so that the scale dissolving fluids/chemicals remains in contact with the upper zone. Suitable scale dissolving fluids and chemicals include acidic fluids or strong alkali solutions.

According to several exemplary embodiments, the following mixing and removal procedure was used to form the treatment fluids. First, xanthan gum in a certain concentration was mixed in formate brine and allowed to partially hydrate to form a low viscosity fluid. Second, a cross-linker (e.g., boric acid) was added and mixed into the low viscosity fluid. Third, for high permeability formations, a powdered sand was mixed into the low-viscosity fluid. Sand was not typically added when treating a low permeability formation. Fourth, the low-viscosity fluid (with or without sand) was pumped into the formation. Fifth, the fluid was allowed to set and form a rigid gel. Once the gel was no longer needed, the gel was easily removed with acid (e.g., hydrochloric acid).

Figure 2:
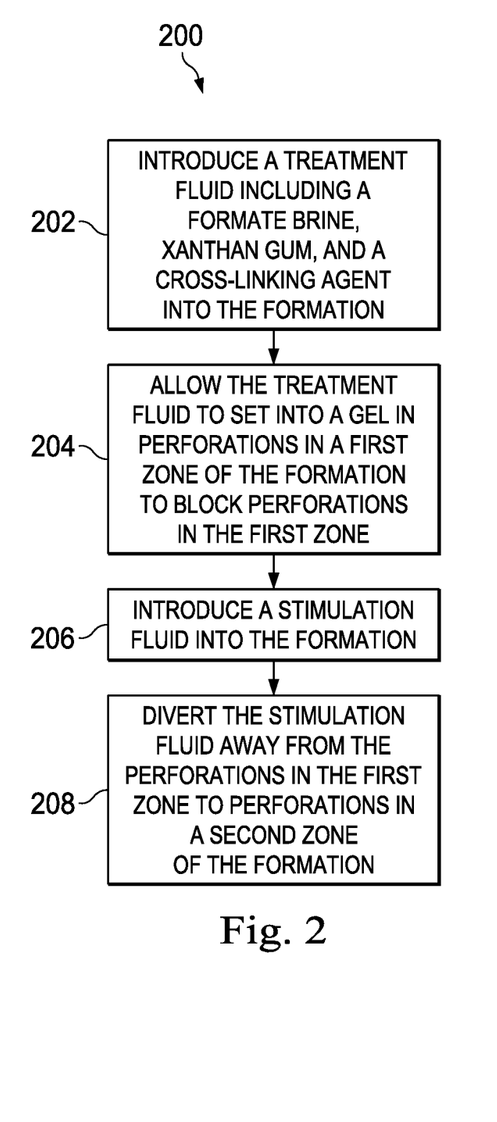
FIG. 2 depicts a method of diverting a stimulation fluid in a subterranean formation according to embodiments of the present invention.

According to several exemplary embodiments, a method of diverting a stimulation fluid over a zone or from one zone to another zone in a subterranean formation is provided. Turning now to FIG. 2, the method 200 includes introducing a treatment fluid including a formate brine, xanthan gum, and a cross-linking agent into the formation in step 202, allowing the treatment fluid to set into a gel in perforations in a first zone of the formation to block the perforations in the first zone in step 204, introducing a stimulation fluid into the formation in step 206, and diverting the stimulation fluid away from the perforations in the first zone to perforations in a second zone of the formation in step 208. The term "introducing," as used herein, includes pumping, injecting, pouring, releasing, displacing, spotting, circulating, or otherwise placing a fluid or material within a well, wellbore, or subterranean formation using any suitable manner known in the art.

Figure 3:
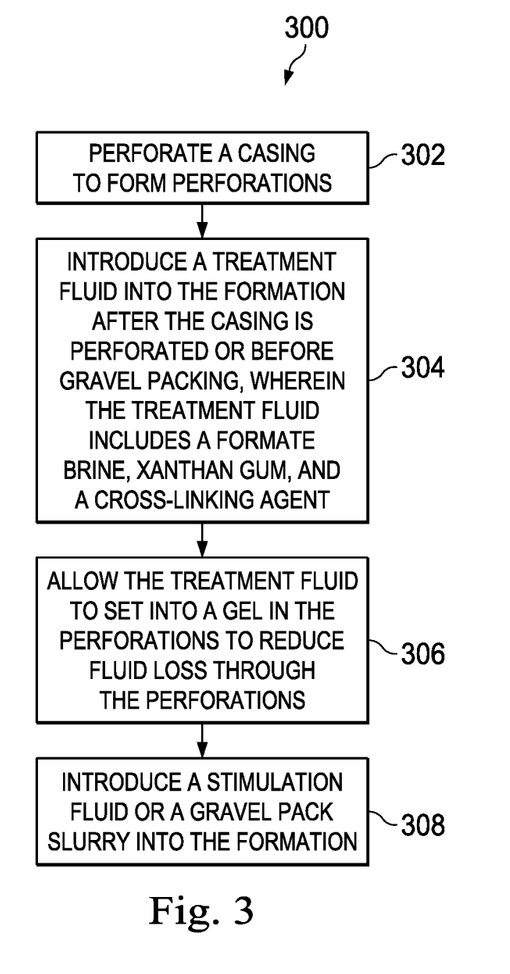
FIG. 3 depicts a method of controlling fluid-loss in a subterranean formation according to embodiments of the present invention.

According to several exemplary embodiments, a method of controlling fluid-loss in a subterranean formation is provided. Turning now to FIG. 3, the method 300 includes perforating a casing to form perforations in step 302, introducing a treatment fluid into the formation after the casing is perforated or before gravel packing, wherein the treatment fluid includes a formate brine, xanthan gum, and a cross-linking agent in step 304, allowing the treatment fluid to set into a gel in the perforations to reduce fluid-loss through the perforations in step 306, and introducing a stimulation fluid or a gravel pack slurry into the formation in step 308.

Figure 4:
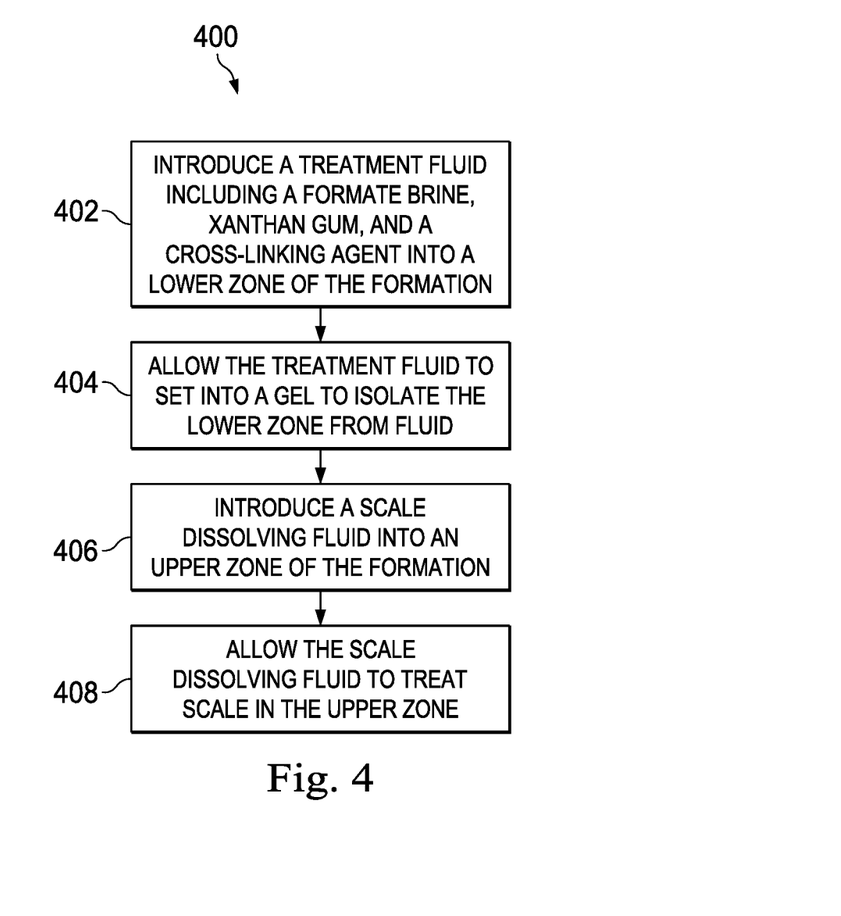
FIG. 4 depicts a method of isolating a zone of a subterranean formation according to embodiments of the present invention.

According to several exemplary embodiments, a method of isolating one zone of a subterranean formation from another zone of the formation is provided. Turning now to FIG. 4, the method 400 includes introducing a treatment fluid including a formate brine, xanthan gum, and a cross-linking agent into a lower zone of the formation in step 402, allowing the treatment fluid to set into a gel to isolate the lower zone from fluid in step 404, introducing a scale dissolving fluid into an upper zone of the formation in step 406, and allowing the scale dissolving fluid to treat scale in the upper zone in step 408.

The following examples are illustrative of the compositions and methods discussed above and are not intended to be limiting.

Example 1

Static Gelation Tests

Qualitative and quantitative analysis of the compositions in Table 1 were performed to evaluate each composition's effectiveness in generating a high viscosity pill with and without added solids. Various sets of tests were performed for 24 hours at 180° F., 250° F., and 300° F. to evaluate the gelation of the compositions of Table 1 in static conditions. Each composition was left static in aging cells for 24 hours to achieve the highest degree of gelation and cross-linking.

TABLE 1

Compositions Tested

| Additives and Order of Mixing | Amounts | | | |
|---|---|---|---|---|
| | Cross-linked Gel #1 | Cross-linked Gel #2 | Cross-linked Gel #3 | Cross-linked Gel #4 |
| 13.1 pounds per gallon (ppg) Potassium Formate Brine | 1000 gallons | 1000 gallons | 1000 gallons | 1000 gallons |
| Xanthan Gum (Barazan ® D viscosifier) | 120 pounds | 120 pounds | 120 pounds | 200 pounds |
| Boric Acid | 30 pounds | — | 30 pounds | 50 pounds |
| K-38 Borate Cross-linker | — | 30 pounds | — | — |
| Powdered Sand (SSA-1 ™ strength-stabilizing agent) | — | — | 1000 pounds | — |

At 180° F., cross-linked gels #1 and #2 formed a rigid gel pill that retained the shape of the container. At 250° F., cross-linked gels #1 and #2 still formed a rigid gel. Testing at 300° F. was not performed for cross-linked gels #1 and #2. Cross-linked gel #3 formed a rigid gel pill at 250° F. that held the powdered sand to form a hard mass. At 300° F., cross-linked gel #4 formed a rigid gel that retained the shape of the container. Since it was confirmed that cross-linked gel #3 formed a rigid gel pill at 250° F., testing at 180° F. and 300° F. was not performed. Cross-linked gel #4 was not tested at 180° F. or 250° F. because of low gel loading. It was observed that with time and temperature, the viscosity of the compositions increases multi-fold.

Example 2

Water Resistance of Cross-Linked Gel #3

The gel block of cross-linked gel #3 formed at 250° F. in Example 1 was soaked in water at room temperature. The gel block retained its shape and was found to be highly resistant to water. No dilution of the gel block was observed even after 8 days of soaking at room temperature.

Example 3

Rheology Testing

Figure 5:
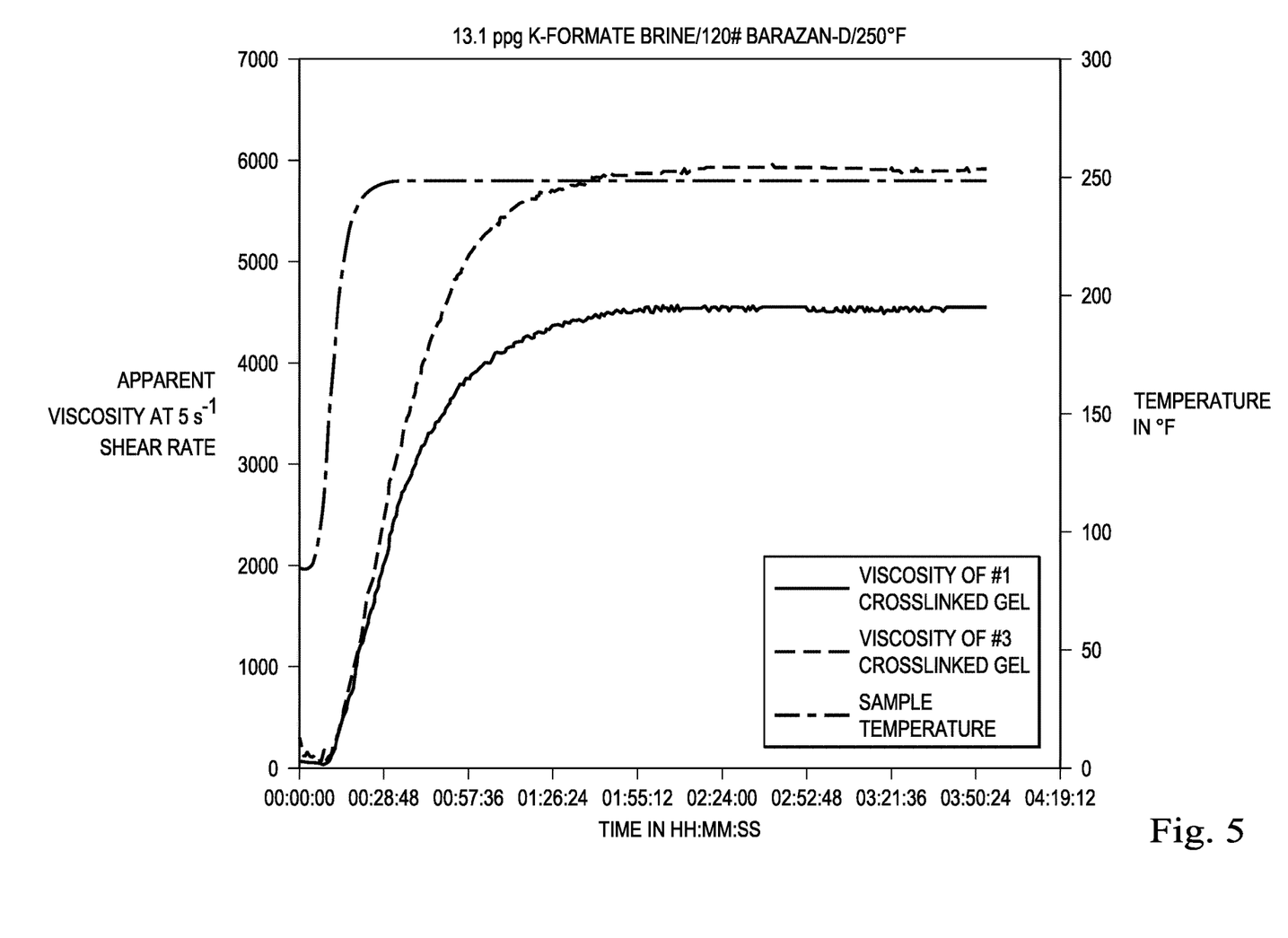
FIG. 5 illustrates the results of rheology testing at 250° F. according to embodiments of the present invention.
Figure 6:
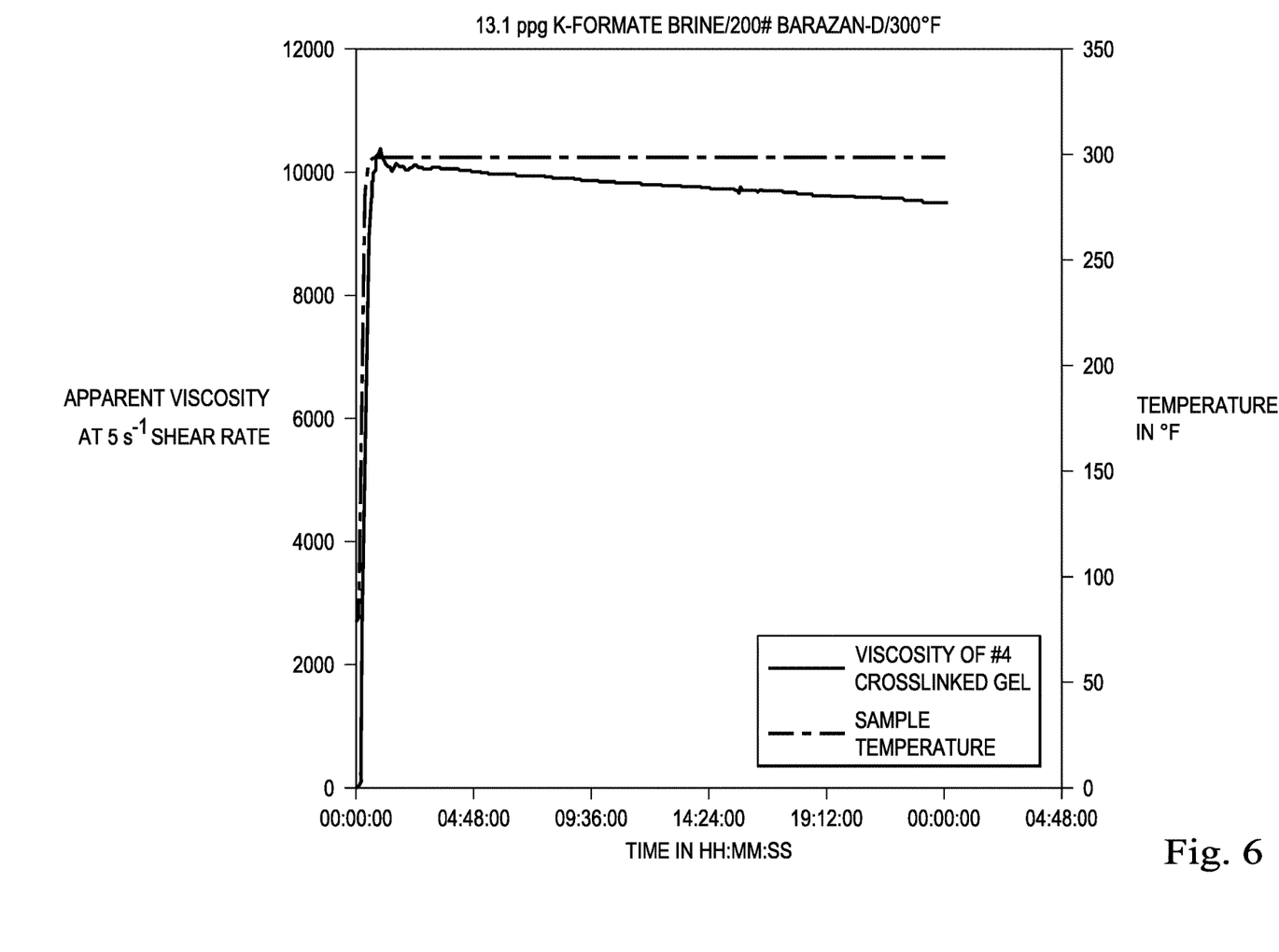
FIG. 6 illustrates the results of rheology testing at 300° F. according to embodiments of the present invention.

Real-time gelation, cross-linking time, and setting time for the slurry was evaluated using a Model 5550 HPHT viscometer with a R1 rotor and B-1 disk or bob from Chandler Engineering at 250° F. and 300° F. and at a shear rate of 5/s. The results are shown in FIGS. 5 and 6. All compositions attained a stable viscosity profile with time depending on composition and temperature. As can be seen, cross-linked gels #1, #3, and #4 attained a stable viscosity profile with time. The compositions tests at 250° F. (i.e., cross-linked gels #1 and #3) achieved their maximum viscosity in about 1 hour, and cross-linked gel #4 achieved its maximum viscosity in about 45 minutes. This suggests longer gelation times as compared to currently used treatment fluids. Extended gelation time, however, helps in placement of the fluid in a targeted zone in the wellbore and formation.

Example 4

Gel Strength and Gel Extrusion

The ability of the compositions to reduce formation permeability and withstand the pressure exerted by wellbore or formation fluids was tested. A test cell 1 inch in diameter and 6 inches in length was used to make a sandpack of 100 mesh sand to represent a highly permeable formation (e.g., about 12,000 millidarcy (mD)). After measuring the initial permeability using a 3% potassium chloride (KCl) solution under a back pressure of 200 psi, the sandpack was treated with cross-linked gel #3 at 250° F. until 2 pore volumes (PV) of cross-linked gel #3 was pumped through the sandpack. Pore volume is the volume of fluid that can be accommodated in a void space in the sandpack. Without disturbing the pressure, the gel inside the cell was allowed to set at 250° F. After 24 hours, water pressure was applied initially at 50 psi to understand the limit of leak-off pressure through the system of completely cross-linked gel #3 and the sandpack. The pressure was increased in increments of 50 psi every 5 minutes. A maximum of 150 psi resistance was observed, which suggested the maximum gel extrusion pressure. This is important in accordance with the overbalance experienced by the gel. With an increase in gel loading, a desired gel extrusion pressure can be achieved.

Figure 7:
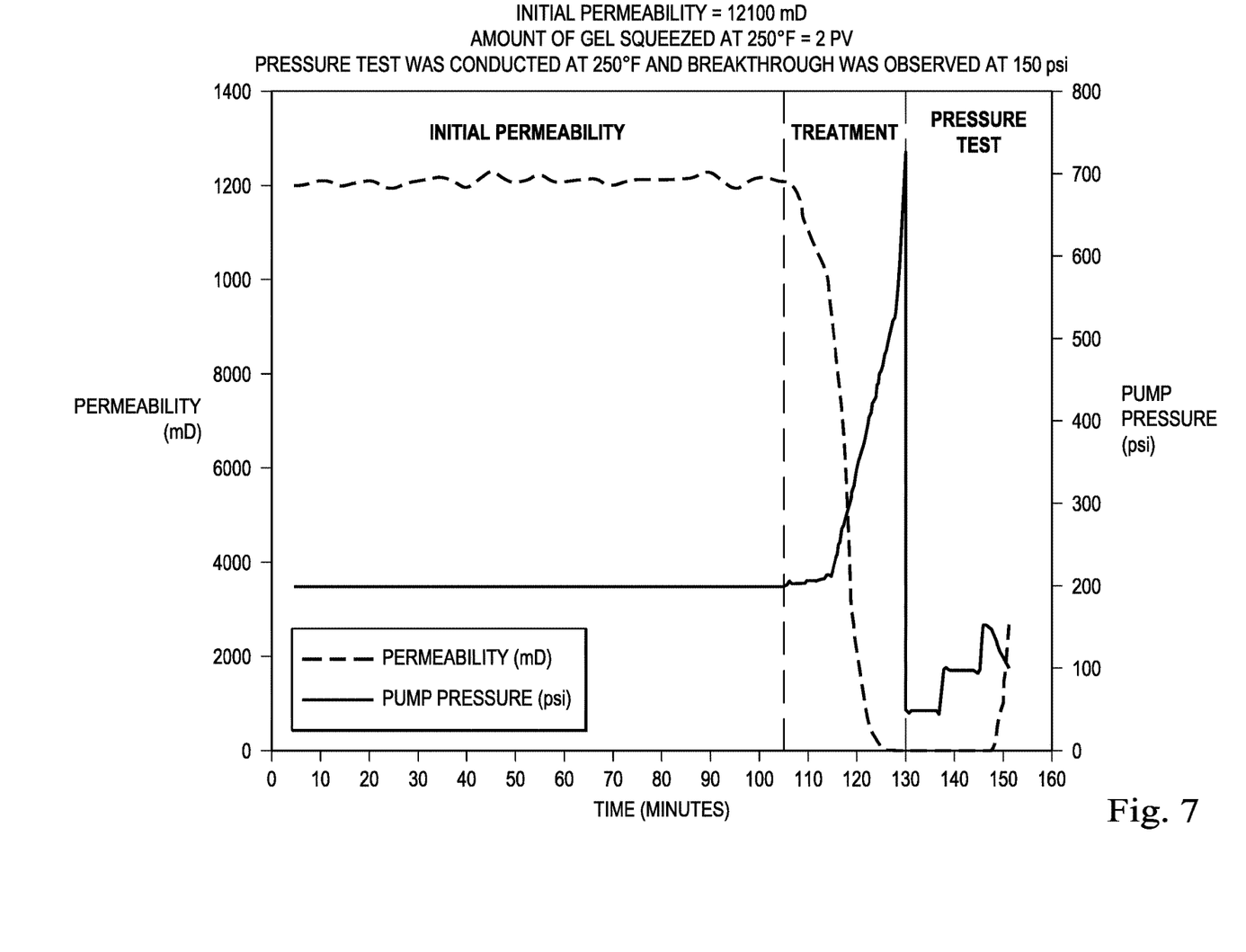
FIG. 7 illustrates the results of a gel strength and gel extrusion test according to embodiments of the present invention.

FIG. 7 illustrates the results of the test. The data confirms that the gel has the capability to reduce or mitigate the flow of fluids from the formation. Higher pressure resistance should be observed in moderate to low permeability sandpack/cores with the same gel loading.

Example 5

Stability and Break Study of Cross-Linked Gel #4

The thermal stability of cross-linked gel #4 (e.g., until the gel loses the shape of the container) was tested for 5 days at 300° F. After 24 hours, and even after 72 hours, the gel maintained the shape of the container. After 120 hours and treatment with a Fann® model 35 viscometer at a 511/s shear rate, the gel became more flowable, but the viscosity was not measurable.

The same gel (150 mL) after the stability study was treated with 15% HCl (100 mL) to check its ability to degrade at 300° F. After 24 hours of treatment in the acid, the viscosity of the broken gel was 43 centipoise (cP) when measured with a Fann® model 35 viscometer at a 511/s shear rate.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of diverting a stimulation fluid over a zone or from one zone to another zone in a subterranean formation, comprising:
   introducing a treatment fluid consisting of a formate brine, xanthan gum, and a cross-linking agent into the formation;
   allowing the treatment fluid to set into a gel in perforations in a first zone of the formation to block the perforations in the first zone;
   introducing a stimulation fluid into the formation; and
   diverting the stimulation fluid away from the perforations in the first zone to perforations in a second zone of the formation.

2. The method of claim 1, wherein the first zone comprises a high permeability zone and the second zone comprises a low permeability zone.

3. The method of claim 1, further comprising perforating a casing to form the perforations in the first zone or the second zone.

4. The method of claim 1, further comprising introducing an acid into the formation.

5. The method of claim 4, further comprising allowing the acid to degrade the gel in the perforations in the first zone.

6. The method of claim 4, wherein the acid comprises hydrochloric acid.

7. The method of claim 1, wherein a pump is used to introduce the treatment fluid into the formation.

8. The method of claim 1, wherein the treatment fluid consists of:
   about 1 weight percent to about 78 weight percent of a formate salt;
   about 1 weight percent to about 3 weight percent of the xanthan gum; and
   about 0.3 weight percent to about 1 weight percent of the cross-linking agent.

9. The method of claim 1, wherein the formate brine comprises one or more of sodium formate, potassium formate, or cesium formate.

10. The method of claim 1, wherein the cross-linking agent comprises a borate cross-linking compound.

11. The method of claim 10, wherein the borate cross-linking compound comprises boric acid.

12. The method of claim 1, wherein the formate brine comprises potassium formate and the cross-linking agent comprises boric acid.

13. A method of controlling fluid-loss in a subterranean formation comprising:
   perforating a casing to form perforations;
   introducing a treatment fluid into the formation after the casing is perforated or before gravel packing, wherein the treatment fluid consists of a formate brine, xanthan gum, a cross-linking agent, and a powdered sand;
   allowing the treatment fluid to set into a gel in the perforations to reduce fluid-loss through the perforations; and
   introducing a stimulation fluid or a gravel pack slurry into the formation.

14. The method of claim 13, further comprising introducing the treatment fluid after introducing the gravel pack slurry.

15. The method of claim 13, further comprising introducing an acid into the formation.

16. The method of claim 15, further comprising allowing the acid to degrade the gel in the perforations.

17. The method of claim 13, wherein the treatment fluid consists of:
   about 1 weight percent to about 78 weight percent of a formate salt;
   about 1 weight percent to about 78 weight percent of the xanthan gum;
   about 0.4 weight percent to about 0.6 weight percent of the cross-linking agent; and
   about 5 weight percent to about 15 weight percent of the powdered sand.

18. The method of claim 13, wherein the formate brine comprises one or more of sodium formate, potassium formate, or cesium formate.

19. The method of claim 13, wherein the cross-linking agent comprises a borate cross-linking compound.

20. The method of claim 13, wherein the formate brine comprises potassium formate and the cross-linking agent comprises boric acid.

* * * * *